United States Patent Office 3,375,070
Patented Mar. 26, 1968

3,375,070
PROCESS FOR SEPARATING TITANIUM TETRA-
CHLORIDE FROM SOLUTIONS THEREOF IN
CHLORO-SILOXANES
Walter Krings, Rheinfelden, and Werner Dittrich, Herten,
Germany, assignors to Dynamit Nobel Aktiengesell-
schaft, Troisdorf, Bezirk Cologne, Germany, a corpora-
tion of Germany
No Drawing. Filed Sept 24, 1963, Ser. No. 311,203
Claims priority, application Germany, Sept. 29, 1962,
D 39,943
5 Claims. (Cl. 23—203)

ABSTRACT OF THE DISCLOSURE

This disclosure pertains to the separating of titanium tetrachloride from solutions thereof containing chlorosiloxanes and silicon tetrachloride. The titanium chloride is separated from the solution by converting the same to titanium oxychloride as a result of the addition to the solution of aqueous hydrochloric acid of at least 30% concentration, the amount of water in the acid comprising 0.38 part by weight thereof to 1 part by weight of titanium tetrachloride in the solution treated.

---

The present invention relates to improved methods for the separation of titanium tetrachloride from solutions containing the same along with chlorosiloxanes and $SiCl_4$. More particularly this invention relates to an improved method for the separation of titanium tetrachloride from the liquid residues consisting in the main of chlorosiloxanes and titanium tetrachloride along with minor amounts of silicon tetrachloride remaining after the distillative separation of silicon tetrachloride from the reaction products obtained in the chlorination of silicon.

The chlorination of high-percentage silicon, more conventionally known as ferrosilicon, to silicon tetrachloride, as it is generally practiced does not directly yield a pure product. The reason is that not only all of the secondary components of the raw material undergo chlorination and in addition the slight oxygen content of the raw material which cannot be removed through conventional processing during the chlorination process gives rise to the formation of oxychlorides, such as for example hexachlorodisiloxane $Si_2OCl_6$, octachlorotrisiloxane, $Si_3O_2Cl_8$, etc. In addition, while it is not here presented for consideration, the question of whether the unavoidable traces of moisture present in the starting materials have an effect on the formation of oxychlorides has still to be answered.

$SiCl_4$ alone of the difficulty volatilizable and insoluble metal chlorides is readily amenable to separation. The chlorosiloxanes and titanium tetrachloride formed in the preparation of silicon tetrachloride dissolve in the $SiCl_4$ and can be separated therefrom by distillative fractionation. Accordingly, what remains after the distillative separation of the $SiCl_4$ is a liquid residue consisting predominantly of chlorosiloxanes and titanium tetrachloride along with small amounts of silicon tetrachloride, representing an over-all quantity of 2–5% of the $SiCl_4$ product. Up until now no use has been found for this residue.

If it is desired to make use of this residue, as for example to remove therefrom its content of silicon compounds, i.e. mainly silicon oxychlorides and minor amounts of $SiCl_4$, it is necessary first to separate from the residue the titanium tetrachloride. In principle, the most simple method for accomplishing such separation is distillation. This, however, is not practicable inasmuch as $TiCl_4$ and the main constituent of the liquid residues obtained in the preparation of $SiCl_4$ by chlorination of high percentage silicon, namely $Si_2OCl_6$ have almost identical boiling points. It is, therefore, necessary to resort to chemical means for accomplishing the separation. It has been proposed in this connection to convert the titanium compound into its corresponding sulfate by treatment with concentrated sulfuric acid followed by the separation of the sulfate by its dissolution in sulfuric acid. However, this method is applicable in the case of small titanium contents only and even at that the procedure is most cumbersome. (See, for example, German Patent No. 948,194.) It has been found that titanium chloride is more readily hydrolyzed than the siloxane compounds. Hydrolysis effected with water is, however, too violent and leads to the hydrolyzation of both Ti and Si compounds. It is therefore, necessary to limit the activity of the water as a hydrolyzing agent.

Objects of the present invention are to provide improved methods for the separation of titanium tetrachloride from mixtures thereof with siloxanes, to provide improved methods for the separation of titanium tetrachloride from residues obtained in the preparation of $SiCl_4$ by chlorination of high percentage silicon, and to provide improved methods for the separation of titanium tetrachloride from its solutions in siloxanes avoiding all of the disadvantages of the art.

Other objects and advantages of the present invention will be evident from the following description:

In accordance with the invention it has now been found that titanium tetrachloride can be simply and economically separated from residues containing in addition to the titanium tetrachloride, siloxanes and small amounts of $SiCl_4$ by treating such a residue with concentrated aqueous solutions of hydrochloric acid. The concentrated hydrochloric acid is at the outset insoluble in the liquid siloxane-titanium tetrachloride-$SiCl_4$ mixture, but upon stirring, hydrolysis of the titanium compound and of small quantities of $SiCl_4$ is initiated. The hydrolysis commences within a few minutes and leads to the formation as hydrolysis product of a mixture of heavily flaked, soild oxychlorides of yellowish hue, which can be readily separated from the substantially unaltered liquid siloxane compounds. By suitably regulating the addition of concentrated hydrochloric acid, the titanium compound present can be precipitated quantitatively and so removed. The following observations are necessary in reference to the quantity and concentration of the hydrochloric acid used. The hydrolysis if carried to completion takes place according to the following equation:

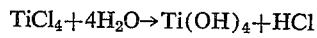
$$TiCl_4 + 4H_2O \rightarrow Ti(OH)_4 + HCl$$

Thus, one part by weight of $TiCl_4$ requires 0.38 part by weight of water. The hydrochloric acid available commercially contains 37 parts by weight HCl and 63 parts by weight of water, which comprises an HCl content of 37% in this aqueous acid solution. Thus, one part by weight of $TiCl_4$ requires 0.61 part by weight of such an acid. If the hydrochloric acid is of a higher or lower concentration, the weight of acid used should be raised or lowered corresponding to the lower or higher water content.

There is no upper limit to the concentration of the aqueous HCl-solution provided that there is sufficient water present to effect the hydrolysis of the $TiCl_4$, i.e. to provide 0.38 part of water for 1 part $TiCl_4$. In the presence of a strong acid concentration the hydrolysis is very selective, only the titanium tetrachloride being hydrolyzed. The HCl concentration should be no lower than 30 percent by weight to prevent hydrolyzing too much of the silicon tetrachloride and chlorosiloxanes, and to convert the $TiCl_4$ to titanium oxychlorides, where the parts by weight relationship of the water in the HCl solution to the $TiCl_4$ is 0.38 to 1.

The quantity of HCl calculated above, necessary for one part by weight titanium tetrachloride is a minimum quantity. When more is used, in addition to the titanium-chloride the silicon tetrachloride is next hydrolyzed and then the chlorosiloxane is hydrolyzed.

When the composition of the feed material is exactly known, it is possible to obtain sufficiently pure hexachlorodisiloxane along with its higher corresponding compounds.

This behavior on the part of the concentrated hydrochloric acid is most surprising in view of the fact that, as is generally known, titanium tetrachloride is dissolved by concentrated hydrochloric acid to produce solutions of yellowish hue containing $TiCl_4$ and $H_2TiCl_6$. The fact that in this case the opposite effect is observed, namely a precipitation of oxidic titanium compounds is probably attributable to the other solvents present, namely the chlorosiloxanes which are not good solvents for HCl. However, with concentrated hydrochloric acid, even at low temperatures, it is possible to achieve very high HCl concentrations which act to promote the formation of $TiCl_4$ and $H_2TiCl_6$.

As noted above, complete hydrolysis results in the formation of $Ti(OH)_4$; however, in accordance with the invention, the concentration of the hydrochloric acid is regulated so that the hydrolysis proceeds only to the formation of the insoluble oxychlorides.

The oxychlorides which are filtered off have, at the outset a yellowish hue, but change to pure white titanic acid and silicic acid as a result of contact with the atmospheric moisture. It is known from the literature (Gmelin, Handbuch der anorgan. Chemie, No. 41, Titanium, p. 322) that $Ti(OH)_2Cl_2$ is yellow, while $Ti(OH)_3Cl$ and most particularly $Ti(OH)_4$ are pure white. It is, therefore, seen that in accordance with the process of the invention the hydrolysis proceeds only as far as the formation of the oxychlorides, which are thereupon precipitated in an insoluble state.

The invention may be described in greater detail with the aid of the following examples which are presented as illustrative only.

*Example 1*

1000 parts by weight of the residue of $SiCl_4$ fractionation containing 12.5 g./l. Ti approximately equivalent to 3.3 percent by weight of $TiCl_4$ are admixed at room temperature with 41.3 parts by weight of concentrated hydrochloric acid in the form of a 37% aqueous solution thereof, that is to say with about 63 parts by weight of water under vigorous stirring. The reaction sets in within a few seconds, the liquid medium becoming cloudy and a heavy stream of gaseous hydrochloride being given off. Almost directly, a yellowish, firmly coagulated precipitate, floats up to the surface and can be readily filtered off. Following a period of 20 minutes, the precipitate is separated by filtration. The presence of titanium can no longer be ascertained in the filtrate remaining using the pyrogallol color reaction technique. Exact analysis discloses that the titanium content in the filtrate comprising substantially siloxanes with small amounts of $SiCl_4$ amounts to 2.5 mg. Ti/l. approximately equivalent to $6.10^{-6}$ $TiCl_4$. This indicates that the titanium has been quantitatively removed from the chlorosiloxane mixture by treatment with the concentrated hydrochloric acid.

*Example 2*

1000 parts by weight of a residue of $SiCl_4$ fractionation containing 16.7 g./l. Ti approximately equivalent to 4.25 percent by weight of $TiCl_4$ are admixed at room temperature with 32.5 parts by weight of hydrochloric acid in the form of a 33% aqueous solution thereof, that is to say with about 67 parts by weight of water under vigorous stirring. The further procedure is the same as in Erample 1. The titanium content of the filtrate of this example was found to be 3.3 mg. Ti/l. approximately equivalent to $8.10^{-6}$ $TiCl_4$.

We claim:

1. The method of separating titanium tetrachloride from solutions containing the same along with chlorosiloxanes and silicon tetrachloride, which comprises treating such a solution with an aqueous hydrochloric acid solution wherein the hydrochloric acid content is at least 30% by weight and the relationship of the water content in the hydrochloric acid solution to the titanium tetrachloride is 0.38 part by weight of water to 1 part by weight of titanium tetrachloride, whereby there are produced readily separable titanium oxychlorides by reaction of the titanium tetrachloride with the water present in said hydrochloric acid solution and separating the solid titanium oxychlorides from the remaining solution.

2. The method of separating titanium tetrachloride from solutions containing the same along with chlorosiloxanes and silicon tetrachloride, which comprises treating such a solution with an aqueous hydrochloric acid solution wherein the hydrochloric acid content is at least 30% bp weight and the relationship of the water content in the hydrochloric acid solution to the titanium tetrachloride is 0.38 part by weight of water to 1 part by weight of titanium tetrachloride at room temperature, whereby there are produced insoluble, readily separable titanium oxychlorides by reaction of the titanium tetrachloride with the water present in said hydrochloric acid solution and separating the solid titanium oxychlorides from the remaining solution.

3. Method according to claim 2 wherein said solid titanium oxychlorides are separated by filtration.

4. The method of claim 1 wherein the hydrochloric acid used has a content of 37% HCl.

5. The method of claim 2 wherein the hydrochloric acid used has a content of 37% HCl.

References Cited

UNITED STATES PATENTS

| 2,927,843 | 3/1960 | Dess | 23—203 X |
| 3,108,854 | 10/1963 | Davis | 23—203 X |

FOREIGN PATENTS

| 948,149 | 8/1956 | Germany. |
| 1,278,312 | 10/1961 | France. |

OSCAR R. VERTIZ, *Primary Examiner.*

B. H. LEVENSON, *Assistant Examiner.*